United States Patent Office 3,345,804
Patented Oct. 10, 1967

3,345,804
SEPARATION OF GASES BY GAS-SOLID CHROMATOGRAPHY IN A SYNTHETIC DIAMOND COLUMN
Thomas L. Mariani, 145 Allwood Place, Clifton, N.J. 07012; Robert P. Hirschmann, 2 Glen Cove Road, Parsippany-Troy Hills, N.J. 07054; Dennis Cupolo, 59 Arlington Ave., Newark, N.J. 07104; and Charles J. Peterman, 200 Baldwin Road, Parsippany, N.J. 07054
Filed Mar. 4, 1966, Ser. No. 531,678
12 Claims. (Cl. 55—67)

ABSTRACT OF THE DISCLOSURE

Process for separating the components of gaseous mixtures from each other by passing the mixture in a stream of inert gas through a column of synthetic diamantiferous material composed of aggregates of individual diamond particles, said aggregates having average diameters less than about 0.15 micron, a surface area between about 40 and 400 square meters per gram, the surface area of the diamond powder at least 10% covered with oxygen-containing functional groups.

---

This invention relates to a process for separating fluid materials from mixtures thereof with other fluid materials, and more particularly to a process involving gas-solid chromatography.

It has been known in the past to separate gaseous mixtures into their individual components especially for purposes of purification or analysis, by passing the mixed gases or samples thereof in a stream of inert carrier gas such as helium through an elongated column packed with an inert solid substrate having deposited thereon a selective adsorbent liquid. The carrier gas is swept through the column under sufficient pressure to force the mixed gases along with it through the column. The adsorbent adsorbs the several components of the mixture and holds them with varying tenacity so that they are differentially released to the constantly flowing carrier gas, and thus the different components are retained for different lengths of time in the column and emerge at different times. Such a proceedure wherein a liquid is used as the selective adsorbent is called "gas-liquid" chromatography.

The use of "gas-solid" chromatography wherein the selective adsorbent is a solid, while presenting a number of operational advantages over the gas-liquid procedure, has not found wide application because of the absence of effective solid adsorbents. It is known to use active carbon as a solid adsorbent, but this material is unsatisfactory for many purposes, notably for the separation of reactive gases which, at elevated temperatures, tend to react with the active carbon. The carbon columns, moreover, cannot readily be regenerated by heat when they become blocked with more or less permanently adsorbed materials since the temperatures sometimes necessary for regeneration, e.g. ca. 500° C. tend to destroy the carbon surface, especially if air or other oxidizing materials are present.

An object of the present invention is to provide a process of fluid separation by gas-solid chromatographic methods which is adapted to the separation of a wide variety of gases and vapors, including reactive gases.

These and other objects are accomplished according to our invention wherein fluid mixtures to be separated are passed, in a stream of inert carrier gas at a temperature sufficient to maintain the components of the mixture in the gaseous state, through a stationary bed or column of synthetic diamond powder as defined hereinafter, whereby the individual components of the fluid mixture are selectively adsorbed, and maintaining the flow of said inert gas through the diamantiferous powder for a time sufficient to cause the elution of at least one component of the mixture from the column.

In the drawings, FIGURES 2–7 inclusive represent chromatograms obtained in the diamond packed column showing separations into their components of a number of mixtures.

Figure 1:
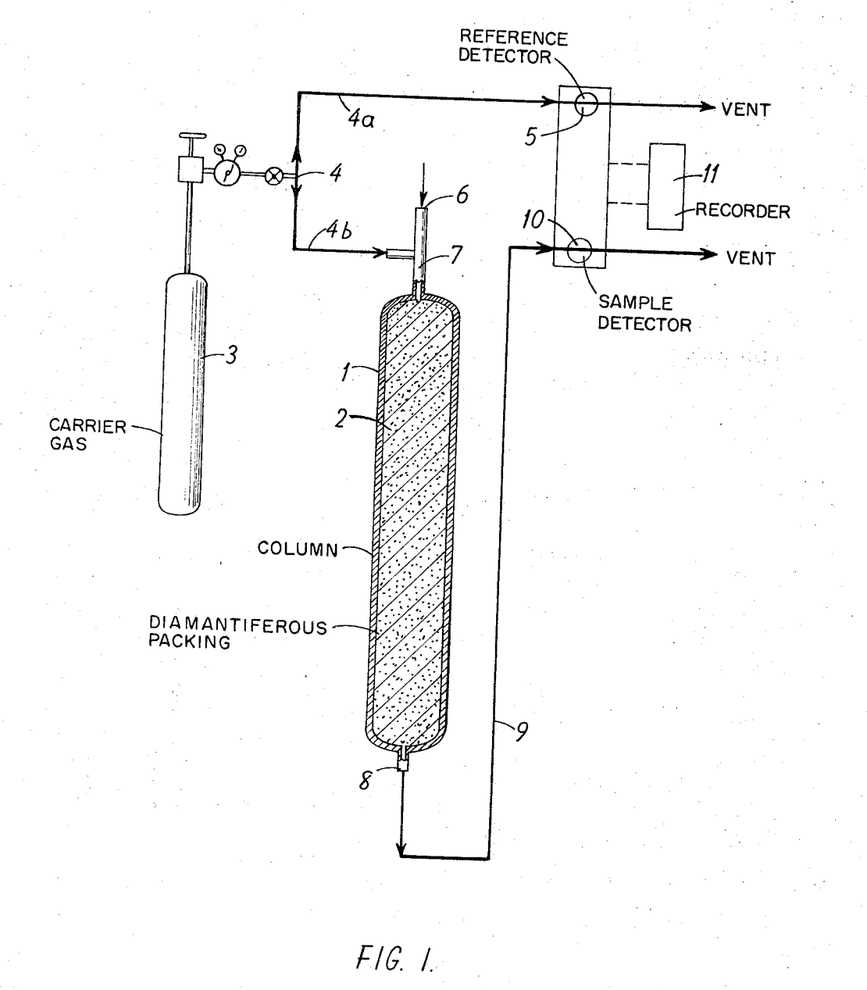
FIGURE 1 illustrates schematically one means for carrying out the process of the invention.

In the drawings, numeral 1 represents a chromatographic column packed with diamantiferous adsorbent 2. Carrier gas storage cylinder 3 is connected by split line 4 to reference detector 5 through line 4a and to the top of column 1 through line 4b. A sample injection port 6 is provided within gas line 7. Column exit 8 is connected by line 9 to sample detector 10 which in turn is connected to reference detector 5 through a Wheatstone bridge (not shown), opposite arms of which are connected to recorder 11.

In operation, inert carrier gas such as helium is passed from storage cylinder 3 through connection 4 where it is split into two streams at equal pressures and flow rates. One stream is passed through connection 4a into reference detector 5. The other stream is passed through line 4b and connection 7 into chromatographic column 8. When the carrier gas is continuously flowing, a gaseous or vaporizable sample is injected into the heated injection port 6, and, if not already a gas, it is vaporized and swept by the flow of carrier gas into the column 1. The vaporized components of the injected sample show different affinities toward the column packing, hence they are separated into discrete moving bands as the carrier gas continually flushes the column. When each band emerges from the end 8 of the column 1, it is swept into the thermal conductivity detector 10, which in conjunction with a Wheatstone bridge (not shown), between the reference detector 5 and sample detector 10, generates an electrical signal proportional to the amount of component in the carrier gas. The signal is fed to a potentiometric recorder 11 where it activates a pen, producing the peak of the chromatogram.

As is well understood in the chromatographic art, the column may be disposed in any convenient manner, and may be, for example a vertical, horizontal or inclined column, or may be in the form of a coil or other configuration to gain the desired column length in a limited space.

In carrying out the process according to our invention, fluid mixtures containing the components to be separated or identified, are introduced into a stream of inert carrier gas such as helium, wherein the mixture is passed with the carrier gas through a stationary column of the diamond powder which differentially adsorbs the several components of the mixture, thus holding individual components on the column for varying retention times, before being eluted by the inert carrier gas and individually swept out of the column.

For purposes of analysis or separation, the emerging gas stream, carrying the individual components in different portions thereof, is passed continuously through a detector device which is responsive to some property of the component gases, for example, a thermal conductivity cell, which detects any variation of such property from that of the carrier gas. The separate emergence from the column of one or more components of the mixture, detected by the detector device, is noted on a recording element as a peak, corresponding to the emission of each component.

The separated components may be separately collected, if desired, by known methods similar to those applied in gas-liquid chromatography, or one or more of the eluted components may be bled off for further analysis of the particular component, as by infrared spectrogram. On the other hand, notation of the retention times and areas within the recorded peaks may give a sufficient indication of the identities and proportions of the components for analytical purposes. Thus, in general, the quantity of each component can be taken to be represented by the area under its respective peak curve with suitable corrections being made for the respective thermal conductivities of the sample components and other factors as well known in the interpretation of such chromatograms.

The synthetic diamantiferous material which forms the selective solid adsorbent in our process is preferably that described in copending application of Francis J. Figiel and Raffaele F. Muraca, Serial No. 485,392, filed September 7, 1965. Such diamantiferous material is composed of finely divided individual diamond particles having a hydrophilic surface exhibiting acidic properties. It can be prepared according to the above application by subjecting "shock loaded graphite," i.e. graphite which has been exposed to shock pressures and temperatures within the region of diamond stability, and thus containing fine diamond particles, to oxidation with nitric acid at temperatures of at least about 280° C., preferably above 300° C. at atmospheric pressure. The finely divided diamantiferous material thus produced and utilizable in our present invention is composed of polycrystalline aggregates having an average particle diameter not exceeding about 0.15 micron (1,500 A.) and a surface area between about 40 and 400 square meters per gram, suitably 160–200 square meters per gram. The aggregates are made up of individual diamond crystallites of average particle diameter between about 50 A. and about 300 A. As originally produced as described above, the surface area of the diamond powder contains functional groups including hydroxyl, carboxyl and carbonyl groups covering at least about 10% of its surface. In certain instances, depending on the reaction conditions employed during the oxidation, other oxygen-containing groups such as the products of reaction of these functional groups with each other and the surface atoms of the diamond crystallites, illustratively, anhydride, lactone and ether structures have been additionally found to be attached to the surface of the diamond crystallites.

The diamantiferous material containing these functional groups is useful in the process of our invention. However, if desired, most of the surface groups can be removed as by heating at 600°–1,000° C. in an inert or reducing atmosphere to produce a product having virtually no surface groups or containing greatly reduced concentrations of such groups. The product which results after the heating step is equally effective chromatographically as the original oxidized product. This is important, since it permits regeneration of the column by heat if it becomes contaminated with adsorbed material not readily eluted at lower temperatures.

We have discovered that the above described diamantiferous materials exert selective adsorptions for a wide variety of fluids, including a variety of reactive and/or toxic gases and vapors that have heretofore presented great difficulties in separation and analysis, for example, gaseous and vaporous fluorine compounds.

The diamantiferous material employed in our process can be used as the sole solid material of our adsorbent columns or it may advantageously be mixed with other inert solid support material so long as at least about 1% by weight of the column comprises the diamantiferous material. When used as the sole solid constituent of the column, the extremely fine particle size of the diamantiferous material requires rather higher than usual pressures to propel the inert gas carrier and the fluid to be separated, through even relatively short columns of the pure diamond.

For this reason, and also to conserve the relatively expensive diamantiferous material, we prefer to dilute the diamantiferous material with varying amounts of inert solid diluent of somewhat larger particle size than the diamond, for example between about .590 mm. (30 mesh) and about 0.074 mm. (200 mesh U.S.) preferably No. 30–80 mesh U.S., which not only reduces the expense of the column, but also permits more rapid flow through the column at lower pressures with no diminution in adsorptivity or selectivity. In general, we prefer to employ columns containing at least about 1% of the diamantiferous material, preferably between about 10% and about 50% diamantiferous material with between about 90% and about 50% of inert solid diluent.

Suitable inert solid diluents for supporting the diamantiferous adsorbent include diatomaceous earth, firebrick, silica, alumina, polytetrafluoroethylene, calcium fluoride and the like. Using a column composed solely of diamantiferous material, pressures on the carrier gas will be between about 80 p.s.i.g. and 90 p.s.i.g. With mixtures of 90% diamantiferous material or less and the balance inert diluent of about 80–100 mesh U.S., substantially lower pressures are sufficient, varying somewhat with the diluent material and conveniently being maintained at about 30–70 p.s.i.g. for the majority of separations. Where the diamantiferous material does not exceed about 20%, pressures of about 30–35 p.s.i.g. appear satisfactory in most cases.

Especially suitable as a column packing in our process is the composite material comprising a base of particulate, crystalline calcium fluoride having adsorbed thereon a tenaceously held coating of the above diamantiferous material thereon as described in copending application of Thomas L. Mariani and Robert P. Hirschmann, Serial No. 531,881 filed as of even date herewith. Such calcium fluoride base can be obtained from fluorite mineral and is preferably purified by ignition, to e.g. 900° C., and suitably crushed to a particle size of about 210–590 microns (Nos. 30–70 mesh U.S.). Such particles usually have a surface area on the order of 0.15 square meter per gram. When diamantiferous material as described herein, is added to such calcium fluoride particles as by slowly pouring the diamond particles into the mass of calcium fluoride particles with gentle agitation, the calcium fluoride particles become uniformly coated with the diamond particles. Proportions of diamond as low as about 1.0% by weight of the composite diamond/$CaF_2$ mixture are effective in chromatographic separations. Proportions up to about 20% diamond in the composite mixture adhere tenaciously to the $CaF_2$ surface. Larger proportions of diamond can be used, but tend to separate from the mixture over a period of time.

Any carrier gas can be used which is inert to the gaseous mixture to be separated, including the rare gases, helium, argon, nitrogen and the like.

The process of our invention is adapted to be used in the separation of a wide variety of inorganic and organic fluid mixtures, at least one of whose components is selectively adsorbed by the diamantiferous material in the temperature range of the column and is in the gaseous state at these temperatures. Such temperature range can be, for example, between about 0° C. and about 500° C., preferably from about 20° C. to about 350° C. Flow rates of the carrier gas through the column and temperatures of the gas can be adjusted to provide wider or narrower separations within a workable range, as is well known in the art. Desirable flow rates may range, for example from about 10 to about 50 ml. per second.

For adequate separation of all the components of each mixture, the retention times in the column of the several components should differ from each other by an appreciable interval, for example, by at least about 30 seconds, preferably by about 1 to 2 minutes under the conditions of the run, so as to provide distinct peaks for analysis and distinct non-overlapping release of the individual components.

Gases and vapors which can be separated include mixtures of such gaseous materials as elemental gases, e.g. fluorine, chlorine, etc., as well as air, and both aliphatic and aromatic organic compounds, including the alkanes, cycloalkanes, alkenes, cycloalkenes, fluoroalkanes and fluoroalkenes, kerosenes, gasolines, sulfur hexafluoride, carbon oxides, nitrogen oxides, carbon tetrafluoride, hydrofluoric acid, tungsten hexafluoride, chlorine trifluoride and many others.

Our process is especially adapted for the separation of mixtures containing at least one reactive fluorine-containing compound, for example, mixtures containing such compounds as fluorine, hydrogen fluoride, oxygen difluoride, the chlorine fluorides and fluorinating materials such as $ClF_3$. It is also capable of effecting an excellent separation into individual components of mixtures of fluoroalkanes and fluoroalkenes. Another important application of our invention is in the separation of impurities from reactive gas mixtures, particularly the separation of components such as $F_2$, $ClF$, $ClF_2$, HF, $OF_2$ and air occurring as impurities in chlorine trifluoride ($ClF_3$) as manufactured by the reaction of chlorine and fluorine in a catalytic metal reactor, e.g. a nickel reactor, at elevated temperatures, for example 280° C.

Separations according to our process can either be complete so as to resolve the mixture into all of its components, or they can be partial, in resolving complicated mixtures into simpler mixtures with fewer components.

Retention times in the column will vary, not only with the individual components to be separated, but also with the conditions of temperature of the column, pressure of the carrier gas and proportion of diamantiferous material to inert solid diluent in the column packing. In general, higher pressures and temperatures produce shorter retention times; higher proportions of diamantiferous materials increase retention times. These variables can be adjusted by one skilled in the art to provide conditions best adapted to the particular separation being carried out.

The following specific examples further illustrate our invention. Parts are by weight except as otherwise noted.

*Example 1.—Separation of $F_2$ and HF*

A sixteen foot 1/8" O.D. nickel chromatographic column was packed with calcium fluoride based diamond powder consisting of 90% $CaF_2$ of 210–590 micron particle size (30–70 mesh U.S.) coated with 10% diamond powder of particle diameter 50 A. to 300 A. (.005–.03 micron) having a surface area of about 200 square meters per gram. The column was placed into a standard chromatographic analyzer shown in the drawing. The column was connected to a source of helium gas from which a split stream of gas was flowing, one portion through the reference side of the detector, the other portion flowing through the column and exiting through the sample side of the detector. Helium flow was maintained in each of the streams at 80 ml./minute at a pressure of 30–35 p.s.i.g. A gaseous sample consisting of a mixture of 30 parts $F_2$ and 1 part of HF by volume was injected into the helium gas stream just prior to its entry into the column. The components of the sample gas were retained on the column for different retention times and when released, passed through the sample side of the detector and were recorded by separate peaks which showed the following retention times.

| Component: | Retention time, seconds |
|---|---|
| $F_2$ | 30 |
| HF | 210 |

Figure 2:
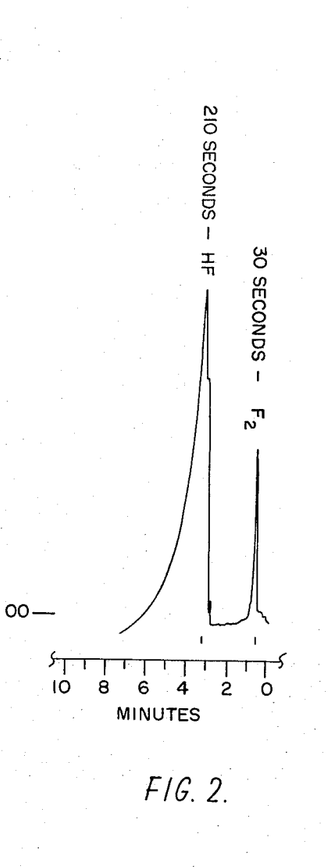
FIGURE 2 shows the chromatogram of a mixture of hydrogen fluoride and fluorine (Example 1).

The chromatogram as recorded is shown in FIGURE 2.

*Example 2.—Separation of HCl and HF*

A mixture of 30 parts HF and 1 part gaseous HCl by volume was injected into the helium carrier stream flowing at 40 ml./minute and 30–35 p.s.i.g. through the 10% diamond, 90% $CaF_2$ column described in Example 1 above and the retention times of the components noted on the detector as before with the results shown below.

| Component: | Retention time, seconds |
|---|---|
| HCl | 120 |
| HF | 420 |

*Example 3.—Separation of HF, HCl and $F_2$*

A sample composed of 30 parts of HF, 1 part HCl and a trace (less than 1 part) of $F_2$ was injected into the helium stream, flowing at 40 ml./min. at 35–40 p.s.i.g. of the chromatographic apparatus described in Example 1. Upon elution from the column, the following retention times were observed.

| Component: | Retention time, seconds |
|---|---|
| $F_2$ | 70 |
| HCl | 120 |
| HF | 400 |

Figure 3:
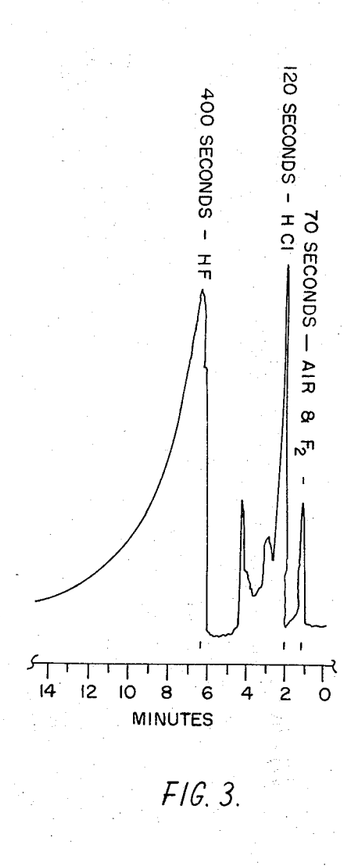
FIGURE 3 is the chromatogram of a mixture of hydrogen fluoride, fluorine and hydrogen chloride (Example 3).

The chromatogram obtained in the above separation is shown as FIGURE 3 of the drawings.

*Example 4*

A sample of chlorine trifluoride ($ClF_3$) prepared by the reaction of chlorine and fluorine was analyzed for character and extent of impurities by injecting a sample thereof into the helium carrier stream, flowing at 30 ml./minute at 30–35 p.s.i.g. of the chromatographic apparatus described in Example 1.

Figure 4:
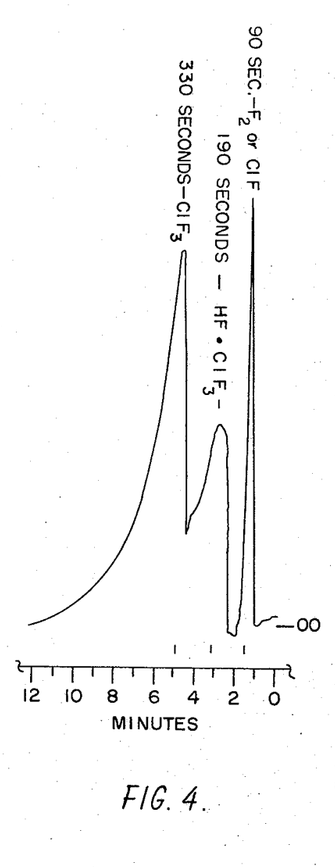
FIGURE 4 is the chromatogram of a mixture of chlorine trifluoride and impurities (Example 4).

The resulting chromatogram obtained is shown in FIGURE 4 of the drawings, revealing components having the retention times and probable identities shown below.

| Compound: | Retention time, seconds |
|---|---|
| $F_2$ or $ClF$ | 90 |
| $HF \cdot ClF_3$ | 190 |
| $ClF_3$ | 330 |

The areas of the several peaks of the chromatogram were 1.0%, 4.1%, and 94.8% respectively, indicating approximately 5% impurities of which the major proportion appeared to be $ClF_3 \cdot HF$ complex.

*Example 5*

Figure 5:
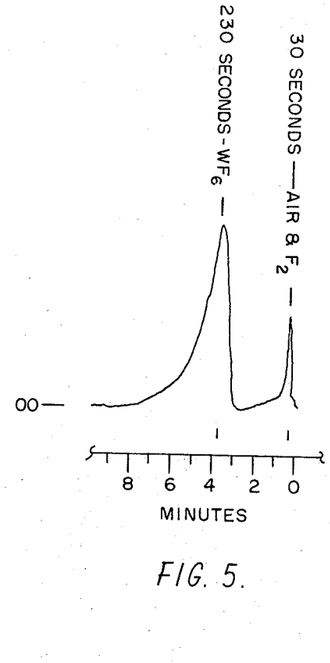
FIGURE 5 is the chromatogram of a mixture of fluorine and tungsten hexafluoride (Example 5).

A two foot long 1/8" O.D. copper column was packed with an 85% calcium fluoride-15% diamond mixture, the components of which are of the same character as those described in Example 1. The column was "pacified" by passing through it a mixture of $ClF_3$ and $F_2$ at 25° C. for 2 hours. Helium gas was then passed through the column, flow being adjusted to 60 ml./minute at 30–35 p.s.i.g. A gaseous mixture of $F_2$ and $WF_6$ was injected into the flowing helium stream and thereafter was eluted and detected on the recorder, the resulting chromatogram being shown as FIGURE 5 in the drawings. Retention times are shown below.

| Compound: | Retention time, seconds |
|---|---|
| $F_2$ | 30 |
| $WF_6$ | 240 |

Example 6

Figure 6:
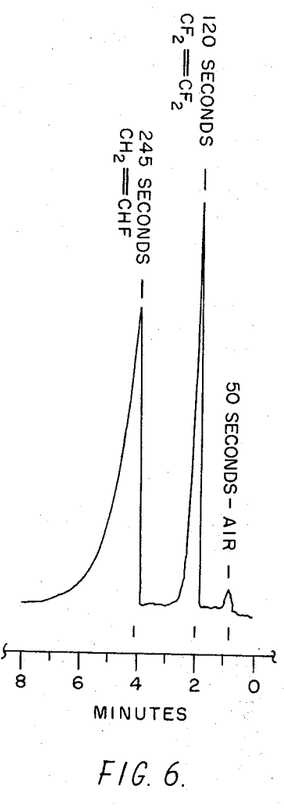
FIGURE 6 is the chromatogram of a mixture of tetrafluoroethylene and vinyl fluoride (Example 6).

A ten foot column of ⅛" O.D. copper tubing was packed with a mixture of 15% diamond powder and 85% calcium fluoride (30–70 mesh U.S.), the components of the mixture being the same as described in Example 1 above. The column was placed into a standard chromatographic analyzer (F & M 500) and maintained at a temperature of 25° C. Helium carrier gas was passed through the column at 35 ml./min. at 30–35 p.s.i.g. A mixture of equal parts by volume of tetrafluoroethylene and vinyl fluoride contaminated with a small amount of air was injected into the helium stream and was passed through the column and through the detector and a chromatogram was recorded which is shown in FIGURE 6 in the drawings. Retention times and approximate peak areas of the components is shown below, the areas being in terms of percent of the total area included within all the peaks.

| Component | Retention Time, sec. | Peak Areas, percent |
|---|---|---|
| Air | 50 | |
| $CF_2=CF_2$ | 120 | 32.3 |
| $CH_2=CHF$ | 245 | 67.7 |

Example 7

Using the same column and apparatus as described in Example 6 above except for a helium gas flow of 20 ml./minute and a column temperature of 70° C., a mixture of equal parts dichlorodifluoromethane and perfluorocyclobutane, contaminated with a small quantity of air, was injected into the helium stream and passed through the column and detector. A chromatogram was taken. Retention times of the components and their respective peak areas are shown below.

| Compound | Retention Time, sec. | Peak Areas, percent |
|---|---|---|
| Air | 60 | |
| $CCL_2F_2$ | 180 | 54.1 |
| $C_4F_8$ | 300 | 45.9 |

Example 8

Figure 7:
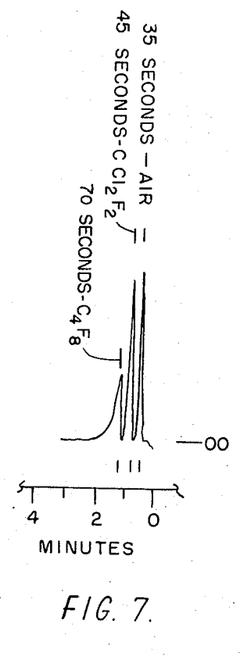
FIGURE 7 is the chromatogram of a mixture of dichlorodifluoromethane and perfluorocyclobutane (Example 8).

A 10 foot ⅛" O.D. copper tube was packed with a mixture of 99% $CaF_2$ (30–70 mesh U.S.) and 1% diamond powder of the character described in Example 1. The column was placed in the standard chromatographic analyzer (F & M Model 500). Helium gas passed through the column at 35 ml./minute at 30–35 p.s.i.g. while the column was maintained at ambient temperature (ca. 25° C.). A mixture of approximately equal parts by volume of dichlorodifluoromethane and perfluorocyclobutane was injected into the helium stream and successively adsorbed, eluted and passed through the detector. A chromatogram was recorded which is shown as FIGURE 7 in the drawings. Retention times of the components and areas beneath the recorded peaks are shown below.

| Compound | Retention Time, sec. | Area in Peaks, percent |
|---|---|---|
| Air | 35 | |
| $CCl_2F_2$ | 45 | 45.9 |
| $C_4F_8$ | 70 | 54.1 |

It will be noted that the areas of the peaks made by the $CCl_2F_2$ and $C_4F_8$ are substantially equal, thus confirming by analysis the known composition of the adsorbed sample.

Example 9

A 30 foot stainless steel ⅛" O.D. column was packed with a mixture of 15% diamond, 85% $CaF_2$, both components being of the character described in Example 1 and placed in the standard chromatographic apparatus. Helium gas flow of 55 ml./min. at 30–35 p.s.i.g. was established, temperature was maintained at about 25° C., and into this gas was injected a small sample of oxygen difluoride $OF_2$. A retention time of 6 minutes was observed for the $OF_2$.

Examples 10–12

Three gaseous mixtures of the approximate compositions shown below were passed with helium carrier gas through the 15% diamond, 85% $CaF_2$ column described in Example 6 and under the same conditions there described and showed retention times set out below.

| Example No. | Component | Percent | Retention Time, seconds |
|---|---|---|---|
| 10 | $NO_2$ | 50 | 60 |
| | $CO_2$ | 50 | 135 |
| 11 | CO | 10 | 60 |
| | $CO_2$ | 90 | 120 |
| 12 | $NO_2$ | 50 | 60 |
| | NO | 50 | 90 |

Example 13

An 8 foot by ¼" O.D. chromatographic column of copper tubing was packed with synthetic diamond powder (100%—no support) of average particle diameter 50 A. to 300 A. (.005–.03 micron) and a surface area of about 200 m.²/gram. The column was placed into a standard chromatographic analyzer of the character shown in the drawing (F & M Model 500). The column was connected to a source of helium gas and maintained at a temperature of about 40° C. while a stream of helium was passed through the column at a flow rate of 30 ml. per minute. Samples of six different fluorocarbons were introduced separately into the helium gas stream just prior to its entry into the diamond column. The several fluorocarbons showed different retention times in the diamond column and were eluted by the continuing helium stream at varying intervals after introduction of the samples. The emerging helium-propelled gas stream was led through a thermal conductivity detector connected to a recorder whereon the presence of a fluorocarbon in the gas was recorded as a peak on the chart. A pressure of 80–90 p.s.i.g. on the helium stream was required to maintain the flow rate of 30 ml./minute through the diamond column.

The widely varying retention times indicate that an excellent separation of the fluorocarbon components from each other can be effected as indicated by the retention times listed under column A in Table I below.

After the determinations listed in A were made, the diamond column was heated to 350° C. for 3 hours while continuing the flow of helium therethrough. Then other samples of the same fluorocarbons were injected into the helium stream and their retention times determined while programming the temperature at 7.9° C. per minute from 50° C. to 250° C. with the results shown in column B of Table I below.

TABLE I.—RETENTION TIMES OF FLUOROCARBONS IN 8 FT. COLUMN OF SYNTHETIC DIAMOND COLUMN PACKING USING HELIUM CARRIER GAS AT 30 ML. PER MINUTE

| Compound | Retention Times, minutes | |
|---|---|---|
| | A—Before Heating | B—After Heating |
| Air | 7.7 | 3.4 |
| $CF_4$ | 8.4 | 4.4 |
| $CF_2=CF_2$ | 10.6 | 8.5 |
| $CH_2=CF_2$ | 12.4 | 13.0 |
| $CF_2H_2$ | 18.0 | 18.2 |
| $CHClF_2$ | 33.2 | 20.6 |
| $CF_3CF_2CF_3$ | 41.5 | 21.5 |

Note.—Temperature of A was 40° C. Temperature of B was programmed 50°–350° C. at 7.9° C./min. so that runs are not strictly comparable. However, these data indicate that the diamond material is an effective adsorbent even after heating to 350° C.

*Example 14*

A four foot, ¼″ O.D. chromatographic column was packed with a mixture of 80% diamond powder of the same character used in Example 13 above and 20% diatomaceous earth aggregates (Chromasorb W) of 0.147–0.175 mm. particle size (175–147 microns, Nos. 80–100 mesh U.S.), another similar column was packed with a mixture of 50% of the diamond powder and 50% of the diatomaceous earth. Through these columns were passed five fluorocarbons introduced into a helium carrier gas flowing at a rate of 30 ml. per minute at 60–70 p.s.i.g.

For comparative purposes, other columns were packed with 100% active carbon (29–65 mesh Tyler); 100% diatomaceous earth, and with mixtures of 50% active carbon; 50% diatomaceous earth; 50% "microfine" graphite; 50% diatomaceous earth; and similar samples of the five fluorocarbons were passed through these columns in a helium stream under the same conditions used in the diamond-containing columns.

Emerging gases were passed through a thermal conductivity detector and peaks indicating the emergence of the test compounds were graphically recorded.

Retention times in the various columns are shown in Table II below.

while maintaining the column temperature at 50°–200° C.

Samples of various fluorocarbons were introduced into the helium gas stream, and after varying retention times, the several compounds were eluted and the stream passed through a thermal conductivity detector. Retention times of the individual compounds were recorded as shown in Table III below.

TABLE III.—RETENTION TIMES OF FLUOROCARBONS ON 50% DIAMOND–50% POLYTETRAFLUOROETHYLENE COLUMN

| Compound: | Retention time, minutes |
|---|---|
| $CHF_3$ | 4.9 |
| $CHClF_2$ | 13.0 |
| $CCl_2FCClF_2$ | 17.0 |
| $CHCl_2F$ | 18.0 |

*Example 16*

A four foot ¼″ O.D. chromatographic column was packed with a mixture of 80% diamond of the character described in Example 13, and 20% of diatomaceous earth of 0.177–0.149 mm. particle size (No. 80–100 mesh U.S.). Helium gas was passed through the column at a flow rate of 8.26 ml./minute with a column pressure of 30 p.s.i.g. Then a sample of mixed gases containing 98% $SF_6$, 1% $CF_4$ and 1% air by volume, was injected into the helium stream. A separation of the components then occurred, and retention times were recorded after elution of the components of the sample and passage through a thermal conductivity detector, as shown in Table IV below.

TABLE IV.—RETENTION TIMES OF CARBON TETRAFLUORIDE AND SULFUR HEXAFLUORIDE IN AN 80–20 DIAMOND-DIATOMACEOUS EARTH COLUMN

| Compound: | Retention time (minute-seconds) |
|---|---|
| Air | 5′59″ |
| $CF_4$ | 9′01″ |
| $SF_6$ | 31′46″ |

TABLE II.—RETENTION TIMES (IN MINUTES) OF FLUOROCARBONS IN VARIOUSLY PACKED 4 FOOT CHROMATOGRAPHIC COLUMNS

| Compound | 80–20 Diamond-Diatomaceous Earth | 50–50 Diamond-Diatomaceous Earth | 100% Active Carbon | 50–50 Active Carbon Diatomaceous Earth | 50–50 Graphite Diatomaceous Earth | 100% Diatomaceous Earth |
|---|---|---|---|---|---|---|
| $O_2N_2$ (Air) | 3.4 | 1.5 | 2.5 | 4.8 | 1.3 | 0.7 |
| $CF_4$ | 4.4 | 1.8 | 7.6 | 6.7 | 1.3 | 0.7 |
| $CF_2=CF_2$ | 8.5 | 5.0 | 21.5 | 22.0 | 1.3 | 0.7 |
| $CH_2=CF_2$ | 13.0 | | 20.3 | 22.4 | 1.3 | 0.7 |
| $C_2F_2H_2$ | 18.2 | 8.5 | 11.9 | 15.5 | 1.3 | 0.7 |
| $CHClF_2$ | 20.6 | 12.0 | 23.0 | 29.0 | 1.3 | 0.7 |

It will be noted from Table II that neither the graphite nor the diatomaceous earth exert any selective adsorption for the components of the test mixture. Active carbon, a known adsorbent exerts adsorptions different from that of the diamond powder, and fails to effect any appreciable separation between tetrafluoroethylene $(CF_2=CF_2)$ and difluoroethylene $(CH_2=CF_2)$.

*Example 15*

A mixture of diamond powder of the character described in Example 13 above was mixed with polytetrafluoroethylene spheres of average diameter of 30–60 mesh U.S. in the proportion of 25% diamond and 75% PTFE, and the mixture was packed into a 4 foot ¼″ O.D. chromatographic column. A stream of helium gas was passed through the column at 30 cc. per minute

*Example 17*

A .01 ml. sample of kerosene was introduced into a stream of helium flowing through a chromatographic column packed with a mixture of 10% diamond powder of the character described in Example 13 and 90% diatomaceous earth (Chromosorb W). A helium flow of 50 ml. per minute was maintained through the column at a helium pressure of about 30–35 p.s.i.g. The column was maintained at a temperature of 154–155° C. while continuing helium flow and passing the effluent out through a thermal conductivity detector. Retention times of various components of the kerosene were recorded as shown in Table V below.

TABLE V.—RETENTION TIMES OF KEROSENE COMPONENTS IN 4 FT. COLUMN OF 10% DIAMOND-90% DIATOMACEOUS EARTH USING A .01 ML. SAMPLE AND TEMPERATURE OF 154–155° C.

| Component No.: | Retention time (minutes-seconds) |
|---|---|
| 1 | 34" |
| 2 | 1'05" |
| 3 | 1'31" |
| 4 | 1'50" |
| 5 | 2'37" |
| 6 | 2'50" |
| 7 | 3'31" |
| 8 | 4'10" |
| 9 | 4'45" |
| 10 | 5'18" |
| 11 | 6'09" |
| 12 | 7'33" |
| 13 | 8'20" |
| 14 | 9'42" |
| 15 | 11'10" |
| 16 | 16' |
| 17 | 20'35" |
| 18 | 24'55" |
| 19 | 29'15" |
| 20 | 33' |

*Example 18*

A 0.01 ml. sample of gasoline was injected into the helium stream passing through a chromatographic column packed with 50% diamond powder, 50% diatomaceous earth. The temperature was maintained at 99° C. Retention times of the separated components are shown in Table VI below.

TABLE VI.—RETENTION TIMES OF GASOLINE COMPONENTS IN 4 FT COLUMN OF 50% DIAMOND-50% DIATOMACEOUS EARTH AT 99° C.

| Component No.: | Retention times (minutes-seconds) |
|---|---|
| 1 | 4'40" |
| 2 | 5' |
| 3 | 11'2" |
| 4 | 11'15" |
| 5 | 27' |
| 6 | 32' |
| 7 | 43' |

*Example 19*

Samples of a number of polar and nonpolar organic compounds were introduced separately in .01 milliliter portions into streams of helium flowing through a chromatographic column packed with a mixture of 50% diamond powder of the character described in Example 13 and 50% diatomaceous earth of particle size 80 to 100 mesh, while maintaining the column temperatures at 101° C. to 156° C. Upon passage of the streams through a thermal conductivity detector, retention times were recorded as shown in Table VII below.

TABLE VII.—RETENTION TIMES OF POLAR AND NONPOLAR COMPOUNDS IN 50–50 DIAMOND-DIATOMACEOUS EARTH COLUMN AT 150° C. TO 156° C.

| Compound: | Retention times (minutes-seconds) |
|---|---|
| $CS_2$ | 1'40" |
| $CCl_4$ | 2'30" |
| Amyl alcohol | 3'34" |
| Chloroform | 3'45" |
| Formaldehyde | 5'12" |
| Isoamyl alcohol | 7'45" |

It can be seen from Table VII that both polar and nonpolar organic compounds can be separated according to the process of our invention. Polar compounds appear to be more strongly retained than nonpolar compounds.

*Example 20*

In a manner similar to that described in Example 19 except that the chromatographic column was packed with a mixture of 10% diamond powder and 90% diatomaceous earth, samples of organic compounds were passed through the column while maintaining the column temperature at 150°–170° C. Retention times shown in Table VIII below were observed.

TABLE VIII.—RETENTION TIMES OF ORGANIC COMPOUNDS IN 10–90 DIAMOND-DIATOMACEOUS EARTH COLUMN AT 150°–170° C.

| Compound: | Retention times (minutes-seconds) |
|---|---|
| Air | 0'37" |
| Benzaldehyde | 1'5" |
| n-Butanol | 2'33" |
| Isoamyl alcohol | 3'19" |
| Aniline | 15'7" |

It can be seen from Table VIII that aromatic compounds, as well as polar aliphatic compounds, can be separated according to the invention.

*Example 21*

Diamond powder of the character used in Example 13 above was heated at 800° C. in hydrogen for 4 hours. The resulting reduced diamond powder was mixed with diatomaceous earth (Chromosorb W) of 80 to 100 mesh U.S. particle size in the proportion of 10% reduced diamond powder to 90% diatomaceous earth. The mixture was packed into a 4 foot ¼" O.D. chromatographic column and subjected to a flow of helium at 30 cc. per minute. A sample of mixed gases containing methane, butane, butene, hexane and trifluorotrichloroethane was injected into the helium stream and passed through the reduced diamond-diatomaceous earth column programmed to 350° C.; and out through a thermal conductivity detector. Retention times of the several components were recorded and are listed in Table IX below.

TABLE IX.—RETENTION TIMES OF MIXED ALKANES ON 10% REDUCED DIAMOND-90% DIATOMACEOUS EARTH FILLED 4 FT. COLUMN

| Compound: | Retention times, minutes |
|---|---|
| Methane | 0.6 |
| Butane | 2.3 |
| Butene | 2.5 |
| $CFCl_2CF_2Cl$ | 4.4 |
| Hexane | 7.8 |

*Example 22*

A four foot ¼" O.D. chromatographic column was packed with a mixture of 50% "reduced" diamond prepared as described in Example 21 above, and 50% of diatomaceous earth (80–100 mesh) and swept with a stream of helium while maintaining the column temperature between 25° C. and 350° C. A sample of mixed fluoroalkanes was injected into the helium stream and passed through the packed column and thence to the thermal conductivity detector, and the retention times of the several components of the mixture were recorded as listed in Table X below.

TABLE X.—RETENTION TIMES OF FLUOROCARBONS ON A 50% REDUCED DIAMOND-50% DIATOMACEOUS EARTH PACKED 4-FOOT COLUMN

| Compound: | Retention times, minutes |
|---|---|
| Air | 2.3 |
| $CF_4$ | 2.6 |
| $CF_2=CF_2$ | 4.2 |
| $CH_2=CF_2$ | 6.7 |
| $CF_2Cl_2$ | 11.7 |
| $CH_2F_2$ | 16.0 |
| $CHClF_2$ | 20.0 |

While the above describes the preferred embodiments of our invention, it will be understood that departures can be made therefrom within the scope of the specification and claims.

We claim:

1. A method for separating gaseous mixtures which comprises passing a gaseous mixture in a stream of inert gas through an elongated column comprising a synthetic diamantiferous material composed of polycrystalline aggregates of individual diamond particles, said aggregates having an average diameter less than about 0.15 micron, and a surface area between about 40 and 400 square meters per gram, said diamantiferous material having at least 10% of its surface area covered with oxygen-containing functional groups, at temperatures between about 20° C. and about 350° C. whereby at least one of the components of said gaseous mixture is separated from the remaining components.

2. The method of claim 1 wherein the diamantiferous material is homogeneously mixed with between about 50% and about 99% of an inert particulate material having a particle size between about 0.590 mm. and about 0.074 mm.

3. The method of claim 1 wherein the diamantiferous material has at least 10% of its surface area covered with hydroxy, carboxyl and carbonyl functional groups.

4. The method of claim 1 wherein the inert gas is helium.

5. The method of claim 1 wherein the diamantiferous material is adsorbed on a base of crystalline calcium fluoride of particle size between about 210 microns and about 590 microns in an amount between about 1% and about 20% of the composite column.

6. The method according to claim 5 wherein the gaseous mixtures contain at least one reactive fluorine-containing compound.

7. The method according to claim 5 wherein the gaseous mixture contains chlorine trifluoride.

8. The method according to claim 1 wherein the gaseous mixture is a mixture of fluoroalkanes and fluoroalkenes of 1 to 3 carbon atoms.

9. The method according to claim 1 wherein the gaseous mixture is a mixture consisting essentially of a major proportion of sulfur hexafluoride and a minor proportion of impurities including carbon tetrafluoride.

10. The method according to claim 1 wherein the gaseous mixture is a mixture consisting essentially of a major proportion of tetrafluoroethylene monomer and a minor proportion of impurities including carbon tetrafluoride.

11. The method of claim 1 wherein at least one component of the mixture has a retention time in the diamantiferous column differing from all the other components of the column by an interval of at least about 30 seconds.

12. The method according to claim 1 wherein the gaseous mixture to be separated comprises a mixture of fluorine compounds, each member of which mixture has a retention time on the diamantiferous column, different from that of every other member of the mixture by an interval of at least about 30 seconds.

No references cited.

REUBEN FRIEDMAN, *Primary Examiner.*

J. DE CESARE, *Assistant Examiner.*

UNITED STATES PATENT OFFICE
CERTIFICATE OF CORRECTION

Patent No. 3,345,804                                  October 10, 1967

Thomas L. Mariani et al.

It is hereby certified that error appears in the above numbered patent requiring correction and that the said Letters Patent should read as corrected below.

In the heading to the printed specification, lines 5 to 10, strike out "Thomas L. Mariani, 145 Allwood Place, Clifton, N. J. 07012; Robert P. Hirschmann, 2 Glen Cove Road, Parsippany-Troy Hills, N. J. 07054; Dennis Cupolo, 59 Arlington Ave., Newark, N. J. 07104; and Charles J. Peterman, 200 Baldwin Road, Parsippany, N. J. 07054" and insert instead -- Thomas L. Mariani, Clifton, Robert P. Hirschmann, Parsippany-Troy Hills, Dennis Cupolo, Newark, and Charles J. Peterman, Parsippany, N. J., assignors to Allied Chemical Corporation, New York, N. Y., a corporation of New York --.

Signed and sealed this 26th day of November 1968.

(SEAL)
Attest:

Edward M. Fletcher, Jr.                                 EDWARD J. BRENNER Attesting Officer                                            Commissioner of Patents